(12) United States Patent
Basu

(10) Patent No.: US 11,106,064 B2
(45) Date of Patent: Aug. 31, 2021

(54) TUNING THE POLAR ANCHORING STRENGTH BY DOPING GRAPHENE FLAKES AND RESULTING ACCELERATED ELECTRO-OPTIC SWITCHING IN LIQUID CRYSTAL DEVICES

(71) Applicant: The Government of the United States of America, as represented by the Secretary of the Navy, Arlington, VA (US)

(72) Inventor: Rajratan Basu, Annapolis, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 386 days.

(21) Appl. No.: 16/164,660

(22) Filed: Oct. 18, 2018

(65) Prior Publication Data
US 2019/0384083 A1 Dec. 19, 2019
US 2020/0409194 A9 Dec. 31, 2020

Related U.S. Application Data

(60) Provisional application No. 62/685,409, filed on Jun. 15, 2018.

(51) Int. Cl.
*C01B 32/184* (2017.01)
*C09K 19/58* (2006.01)
(Continued)

(52) U.S. Cl.
CPC ........ *G02F 1/13306* (2013.01); *C01B 32/184* (2017.08); *C09K 19/582* (2013.01);
(Continued)

(58) Field of Classification Search
None
See application file for complete search history.

(56) References Cited

U.S. PATENT DOCUMENTS

2018/0039122 A1* 2/2018 Lee .................. G02F 1/13439
2021/0047496 A1* 2/2021 Kim .................. D01D 5/00

OTHER PUBLICATIONS

Basu, Rajratan. "Enhancement of polar anchoring strength in a graphene-nematic suspension and its effect on nematic electro-optic switching." Physical Review E 96.1 (2017): 012707.
(Continued)

*Primary Examiner* — Ashok Patel
(74) *Attorney, Agent, or Firm* — United States Naval Academy; Stephen T. Hunnius

(57) ABSTRACT

A method of achieving higher polar anchoring strength of liquid crystal (LC) using monolayer graphene flakes in an LC device and attaining faster electro-optic switching in an LC device comprising the steps of providing graphene in an ethanol solvent, adding a liquid crystal to the graphene and ethanol solution, forming a liquid crystal graphene ethanol solution, evaporating the ethanol, and forming a pure liquid crystal graphene mixture. A liquid crystal device with faster electro-optic switching and higher polar anchoring strength comprising an LC cell having a polyimide (PI) alignment layer, the liquid crystal graphene mixture, wherein the graphene flakes preferentially attach to the PI alignment layer; wherein the effective polar anchoring energy in the LC cell is enhanced by an order of magnitude and wherein the electro-optic response of the LC is accelerated.

6 Claims, 7 Drawing Sheets

(51) Int. Cl.
*G02F 1/133* (2006.01)
*G02F 1/1337* (2006.01)
*G02F 1/00* (2006.01)
*G02F 1/01* (2006.01)
*G02F 1/1341* (2006.01)

(52) U.S. Cl.
CPC .......... *G02F 1/0045* (2013.01); *G02F 1/0107* (2013.01); *G02F 1/1341* (2013.01); *G02F 1/133703* (2013.01); *G02F 1/133711* (2013.01); *C09K 2323/04* (2020.08); *G02F 1/133776* (2021.01)

(56) References Cited

OTHER PUBLICATIONS

Shehzad, Muhammad Arslan, et al. "Nematic liquid crystal on a two dimensional hexagonal lattice and its application." Scientific reports 5 (2015): 13331.

\* cited by examiner

TUNING THE POLAR ANCHORING STRENGTH BY DOPING GRAPHENE FLAKES AND RESULTING ACCELERATED ELECTRO-OPTIC SWITCHING IN LIQUID CRYSTAL DEVICES

REFERENCE TO RELATED APPLICATION

This application is a non-provisional of, and claims priority to and the benefits of, U.S. Provisional Patent Application No. 62/685,409 filed on Jun. 15, 2018, the entirety of which is herein incorporated by reference.

BACKGROUND

This disclosure concerns higher polar anchoring strength of liquid crystal (LC) using monolayer graphene flakes in an LC device.

This disclosure concerns attaining faster electro-optic switching in an LC device by doping monolayer graphene flakes and a new product employing graphene flakes on the polyimide alignment layers in an LC display device for accelerated response time.

SUMMARY OF DISCLOSURE

Description

This disclosure teaches methods and the products for achieving higher polar anchoring strength of liquid crystal (LC) using monolayer graphene flakes in an LC device.

This disclosure teaches procedures and the devices for attaining faster electro-optic switching in an LC device by doping monolayer graphene flakes.

Furthermore, the disclosure teaches a new product employing graphene flakes on the polyimide alignment layers in an LC display device for accelerated response time.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

$$\frac{K_{11}}{W_\theta}$$

as a function of temperature for E7 and E7+GP.

Figure 6:
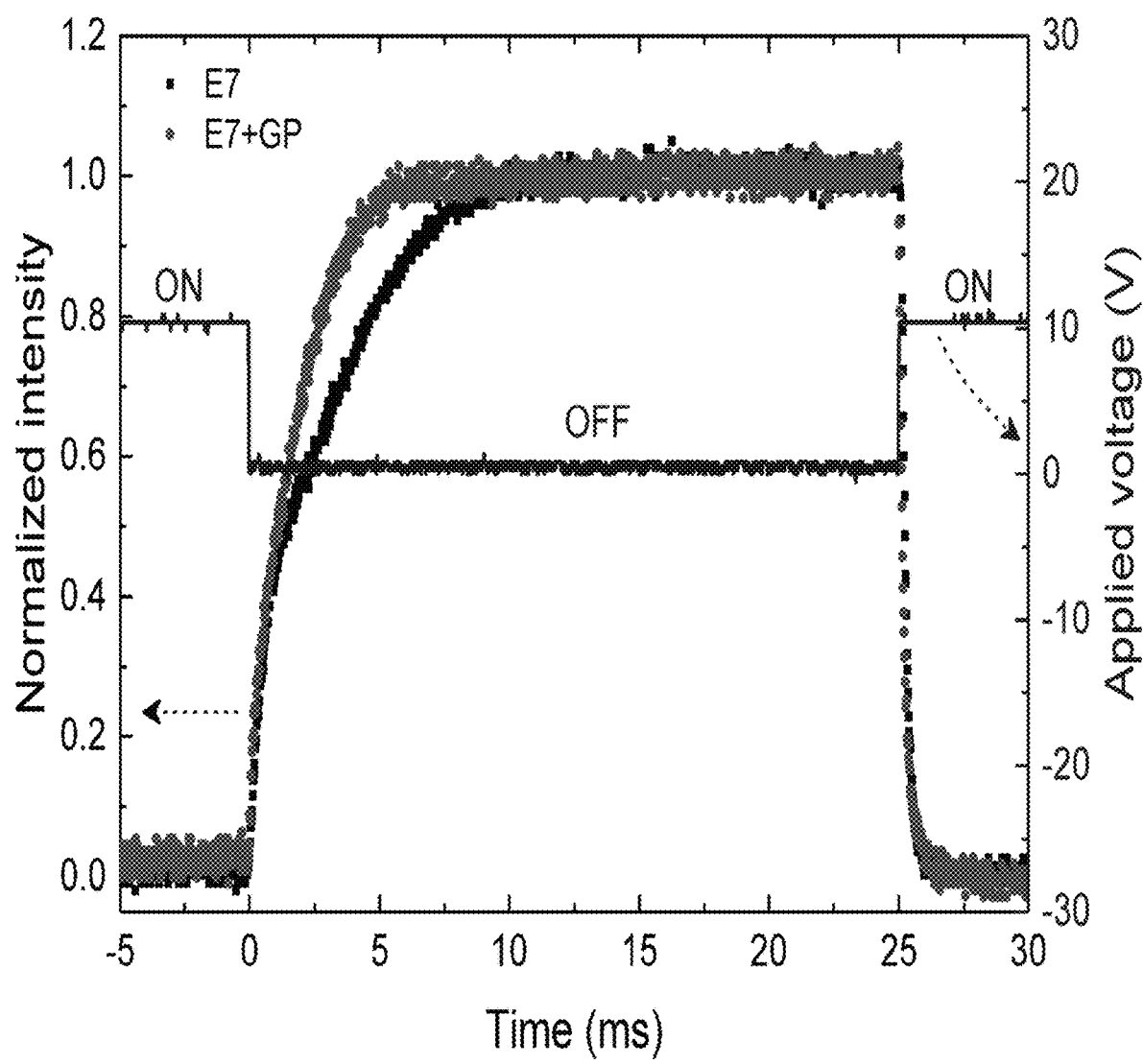

FIG. 6 illustrates Electro-optic switching of E7 and E7+GP cells. The left Y-axis shows the normalized transmitted intensity as a function of time when an applied voltage is turned off at t=0, and then turned on at t=25 ms, for E7 and E7+GP, listed in the legend (T=30° C.). The right Y-axis shows the applied voltage profile across the cells.

Figure 7:
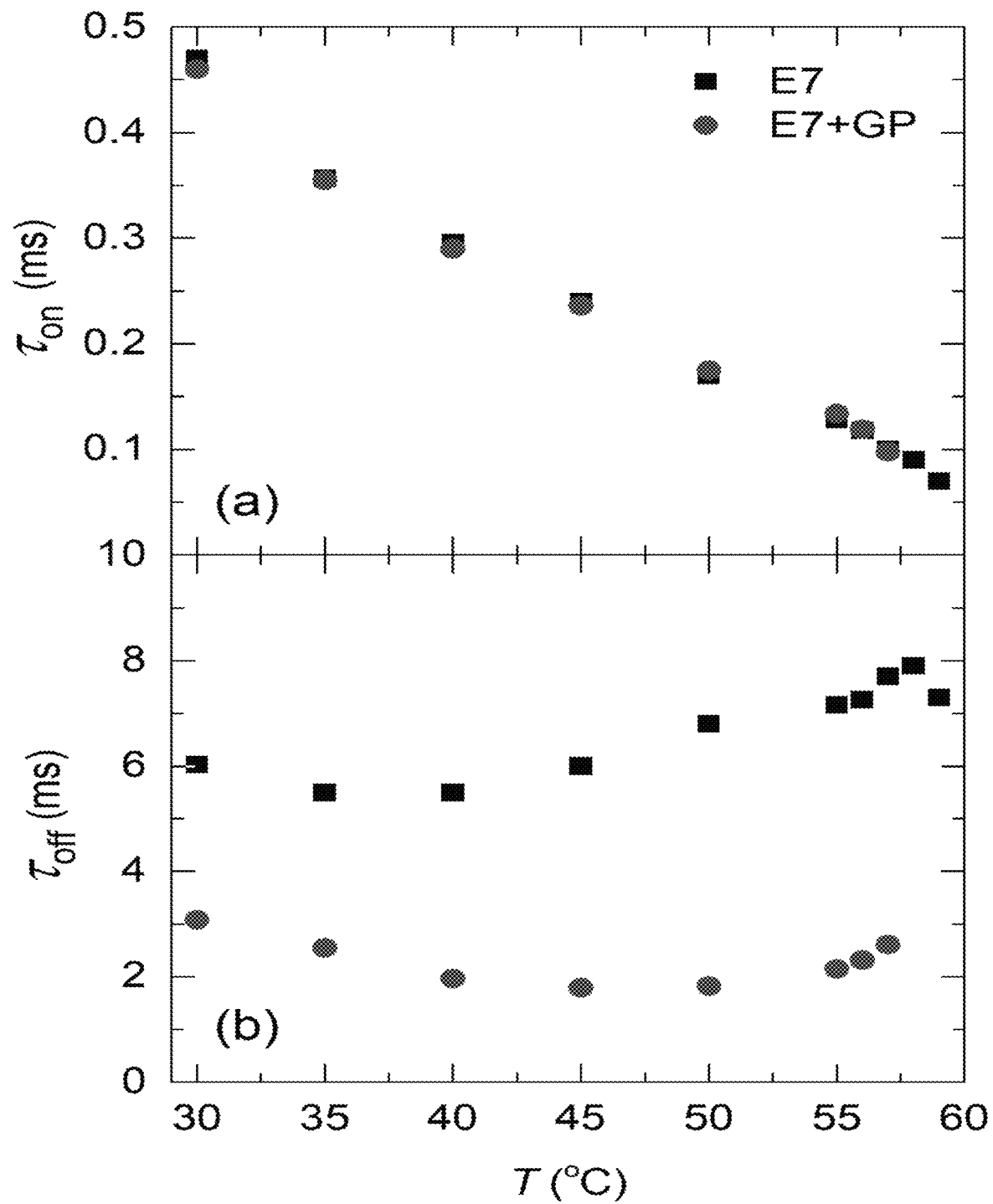

FIG. 7 illustrates Optical switching on, $\tau_{on}$ and optical switching off, $\tau_{off}$ as a function of temperature for E7 and E7+GP listed in the legend.

DETAILED DESCRIPTION OF THE INVENTION

This disclosure teaches methods and devices for achieving higher polar anchoring strength of liquid crystal (LC) using monolayer graphene flakes in an LC device.

This disclosure teaches procedures and the products for attaining faster electro-optic switching in an LC device by doping monolayer graphene flakes.

Furthermore, this disclosure teaches a new product employing graphene flakes on the polyimide alignment layers in an LC display device for accelerated response time.

The interaction of nematic LC with the polyimide (PI) alignment substrates in an LC cell is technologically important for their applications in electro-optical display technology. The LC molecules align with alkyl side chains of the PI alignment film to generate planar alignment on the LC director.

An external electric field then can deviate the director from its initial orientation. The energy cost of this deviation from a planar orientation to a homeotropic orientation is characterized by the polar anchoring strength coefficient, $W_\theta$.

The polar anchoring strength is an important parameter for an LC cell because it influences the LC's electro-optic properties, such as the orientational threshold voltage and response time.

We show here that when the LC cell is filled with the graphene-doped LC, some graphene flakes are preferentially attached to the PI alignment layer and modify the substrate's anchoring property with the LC.

These spontaneously deposited graphene flakes promote planar anchoring at the substrate due to the π-π electron stacking between the graphene and LC, and the effective polar anchoring energy at the PI alignment layer is enhanced by an order of magnitude.

The enhanced anchoring energy in the LC cell accelerates the electro-optic response of the LC.

Example 1

The pristine graphene (GP) sample in ethanol solvent was obtained. The graphene sample contained more than 97% of monolayer flakes (with a small fraction of multilayer flakes) of an average thickness of 0.35 nm and an average lateral size of 550 nm.

The ethanol+GP solution was first remixed by a micro-homogenizer tip of 5 mm diameter at 35000 rpm for 5 min, followed by sonication for 4 h. The liquid crystal E7 ($T_{NI}$=60.5° C.) then was added to the ethanol+GP and sonicated for 5 h, allowing the LC to dissolve completely into the solution.

The ethanol was evaporated slowly at an elevated temperature. Finally, the LC+GP was degassed under a vacuum for 1 h, leaving a pure LC+GP mixture of 2.5×10⁻³ wt %.

Example 2

For consistency, the pure LC was also treated the same way, such as dissolving in ethanol followed by a slow evaporation and degassing. Commercially manufactured planar and homeotropic LC cells with a 1 cm² semitransparent indium tin oxide (ITO) coated area and a d=15 µm spacing were used for the polar anchoring strength measurements.

The electro-optic switching response of the LC was performed using planar LC cells with a 0.25 cm² semitransparent ITO coated area and a d=5 µm spacing.

Example 3

Anchoring Strength Measurement.

The polar anchoring strength coefficient, $W_\theta$ (for a small pretilt angle, $\theta_p$<5°) is defined as $$W_\theta = \frac{2 V_{th}^2}{A \pi^2} \frac{(C_{HT} - C_{PL})^2}{C_{PL}} \frac{1}{\left[1 - \left(\frac{C_{PL}}{C_{HT}}\right)_{V \to \infty}\right]} \quad (1)$$

where $V_{th}$ is the Fréedericksz threshold voltage of the LC in the planar cell, A is the active area of the cells, $C_{HT}$ is the capacitance of the LC filled homeotropic cell, $C_{PL}$ is the capacitance of the LC filled planar cell for $V<V_{th}$.

For this measurement, both the cells must have the same active area, A and thickness, d. In the denominator, $$\left(\frac{C_{PL}}{C_{HT}}\right)_{V \to \infty}$$

is the capacitance ratio of the planar cell to the homeotropic cell for a very high voltage limit. Note that for a positive anisotropic (+Δε) LC, $C_{HT}$ does not change at the high voltage limit as the LC does not undergo Fréedericksz transition in the homeotropic cell.

Figure 1:
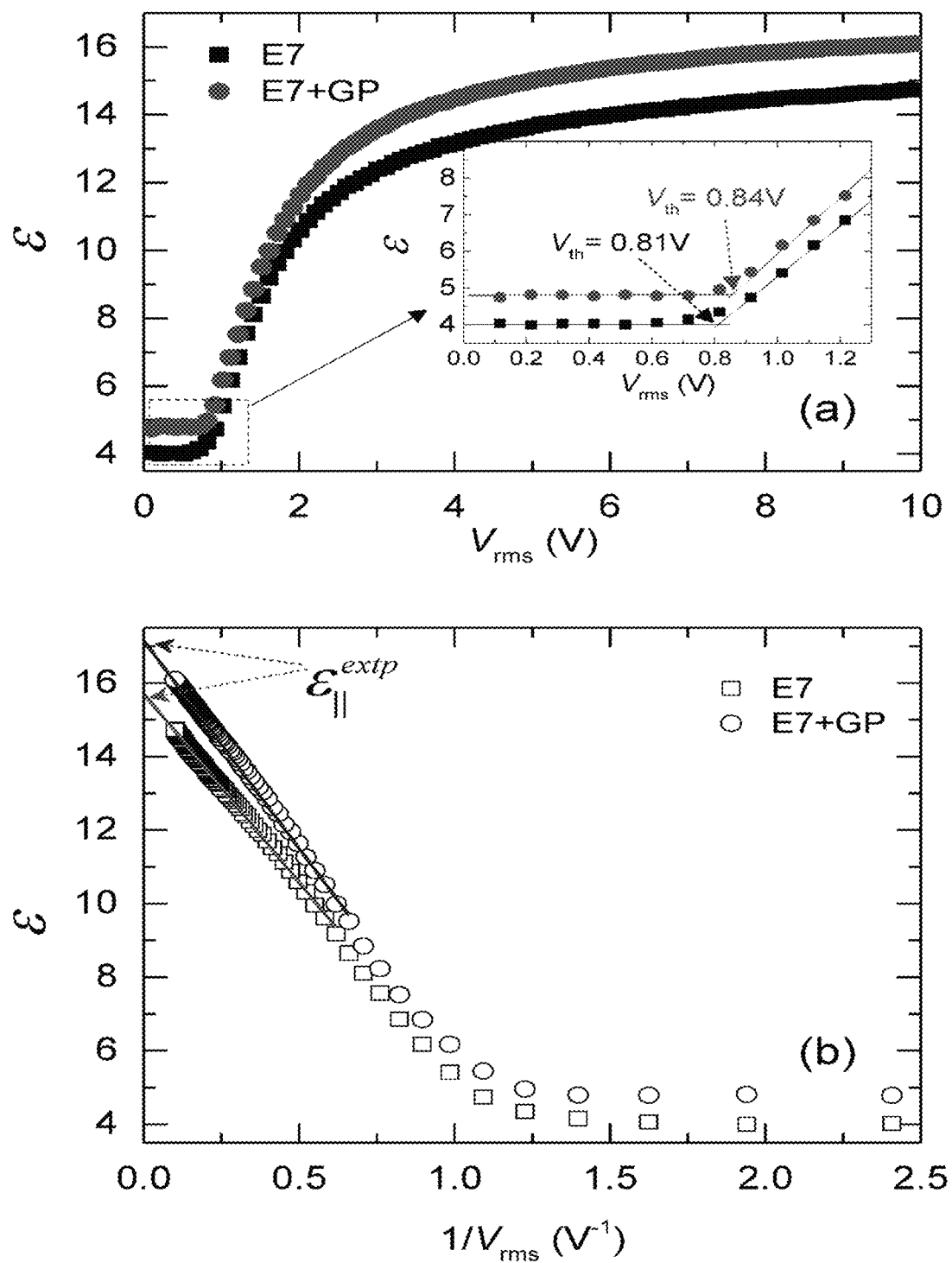
FIG. 1 illustrates the Dielectric constant, $\varepsilon$ for E7 and E7+GP as a function of $V_{rms}$ at T=30° C. The inset shows the Frëedericksz threshold voltage, $V_{th}$ for the samples and the Dielectric constant, $\varepsilon$ for E7 and E7+GP as a function of $1/V_{rms}$ at T=30° C. The solid lines represent the linear fit in the high-voltage linear regime (as $1/V_{rms} \to 0$, $V_{rms} \to \infty$). The extrapolated Y-intercept of the linear fit gives the value of $\varepsilon_{\parallel}^{extP}$.

For the planar cell, $C_{PL}$ at the high voltage limit can be determined from the C vs V⁻¹ curve. For a more accurate measurement of $W_\theta$, Eq. 1 can be rewritten using the dielectric components of the LC, $$\varepsilon_\parallel = \frac{d \, C_{HT}}{A \, \varepsilon_o} \text{ and } \varepsilon_\perp = \frac{d \, C_{PL}}{A \, \varepsilon_o}, \text{ as}$$

$$W_\theta = \frac{2 \varepsilon_0 V_{th}^2}{d \pi^2} \frac{(\varepsilon_\parallel - \varepsilon_\perp)^2}{\varepsilon_\perp} \frac{1}{\left[1 - \frac{\varepsilon_\parallel^{extp}}{\varepsilon_\parallel}\right]} \quad (2)$$

where $\varepsilon_0$ the is free space permittivity, $$\left(\frac{C_{PL}}{C_{HT}}\right)_{V \to \infty} = \frac{\varepsilon_\parallel^{extp}}{\varepsilon_\parallel},$$

and $\varepsilon_\parallel^{extp}$ can be determined from the extrapolated intercept of the ε vs V⁻¹ curve for the planar LC cell, as shown in FIG. 1.

An Automatic Liquid Crystal Tester was used to measure the capacitance of the empty cells and filled cells at 1000 Hz. Then the dielectric components were obtained using the ratio of the filled cell capacitance to the empty cell capacitance:

$$\varepsilon_\parallel = \frac{C_{HT}}{C_{HT\_empty}} \text{ and } \varepsilon_\perp = \frac{C_{PL}}{C_{PL\_empty}} \text{ (for } V < V_{th}\text{).}$$

Equation 2 eliminates the error due to any small mismatch in d and A between the planar and homeotropic cells by introducing their empty cell capacitances.

FIG. 1 shows the dielectric constant s for E7 and E7+GP samples as a function of rms voltage, obtained from the planar cells. Both the samples exhibit a typical Fréedericksz transition. The inset in FIG. 1 shows $V_{th}$ for both the samples. FIG. 1 shows ε vs V⁻¹ for E7 and E7+GP samples. The solid lines represent the linear fit in the linear regime. The extrapolated Y-intercept of the linear fit gives the value of $\varepsilon_\parallel^{extP}$, as shown in FIG. 1.

After calculating the dielectric components from the appropriate LC cells, Eq. 2 was used to obtain $W_\theta$. In one embodiment of the invention, shown in FIG. 2, the anchoring energy $W_\theta$ of the GP doped LC is significantly higher than that of the pure LC. At 30° C., $W_\theta^{E7}=3.8\times10^{-5}$ J m$^{-2}$ and $w_\theta^{E7+GP}=4.1\times10^{-4}$ J m$^{-2}$.

Figure 2:
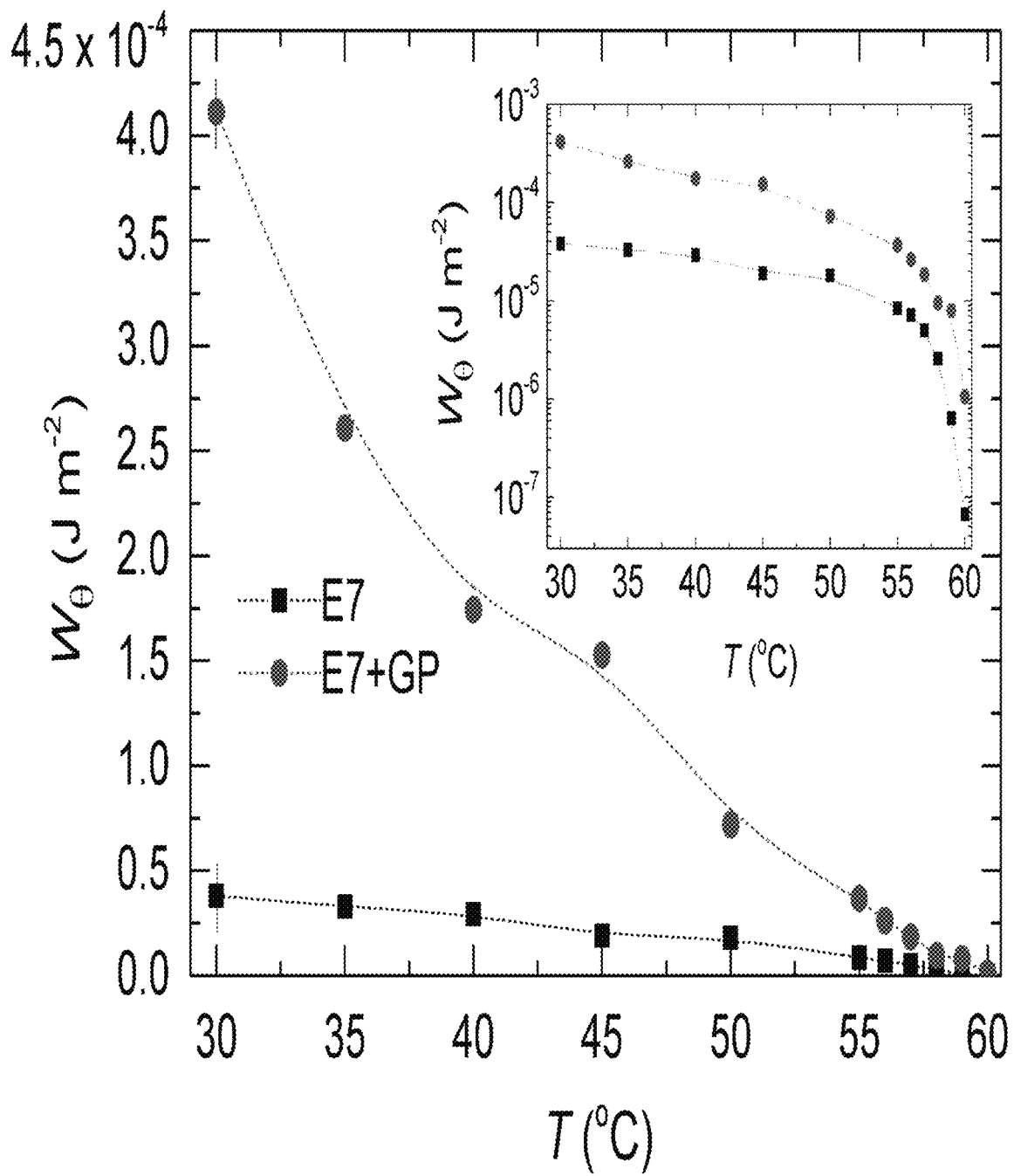
FIG. 2 illustrates Polar anchoring strength coefficient, $W\theta$ as a function of temperature for E7 and E7+GP on the linear scale. Typical error bars are shown. The dotted lines are guide-to-the-eye. The inset shows $W_\theta$ as a function of temperature for E7 and E7+GP on the logarithmic scale.

Note that FIG. 2 shows $W_\theta$ on a linear scale and the inset shows the same on a logarithmic scale. These two scales clearly depict the dramatic increase in $W_\theta$ and its pretransitional behavior when graphene flakes are doped in the LC. Note that the inset in FIG. 1 shows that $V_{th}$ for the E7+GP is higher than that of E7, indicating an increase in effective $W_\theta$ for the hybrid sample.

Example 4

Planar Nematic Alignment on Graphene Film and Enhanced Polar Anchoring.

LC molecules can anchor to the honeycomb pattern of graphene or carbon nanotubes, employing the π-π electron stacking.

Density-functional calculations suggest that this anchoring is further strengthened with a binding energy of −2.0 eV by electrostatic energy due to a considerable amount of charge transfer from the LC molecule to the honeycomb pattern.

Figure 3:
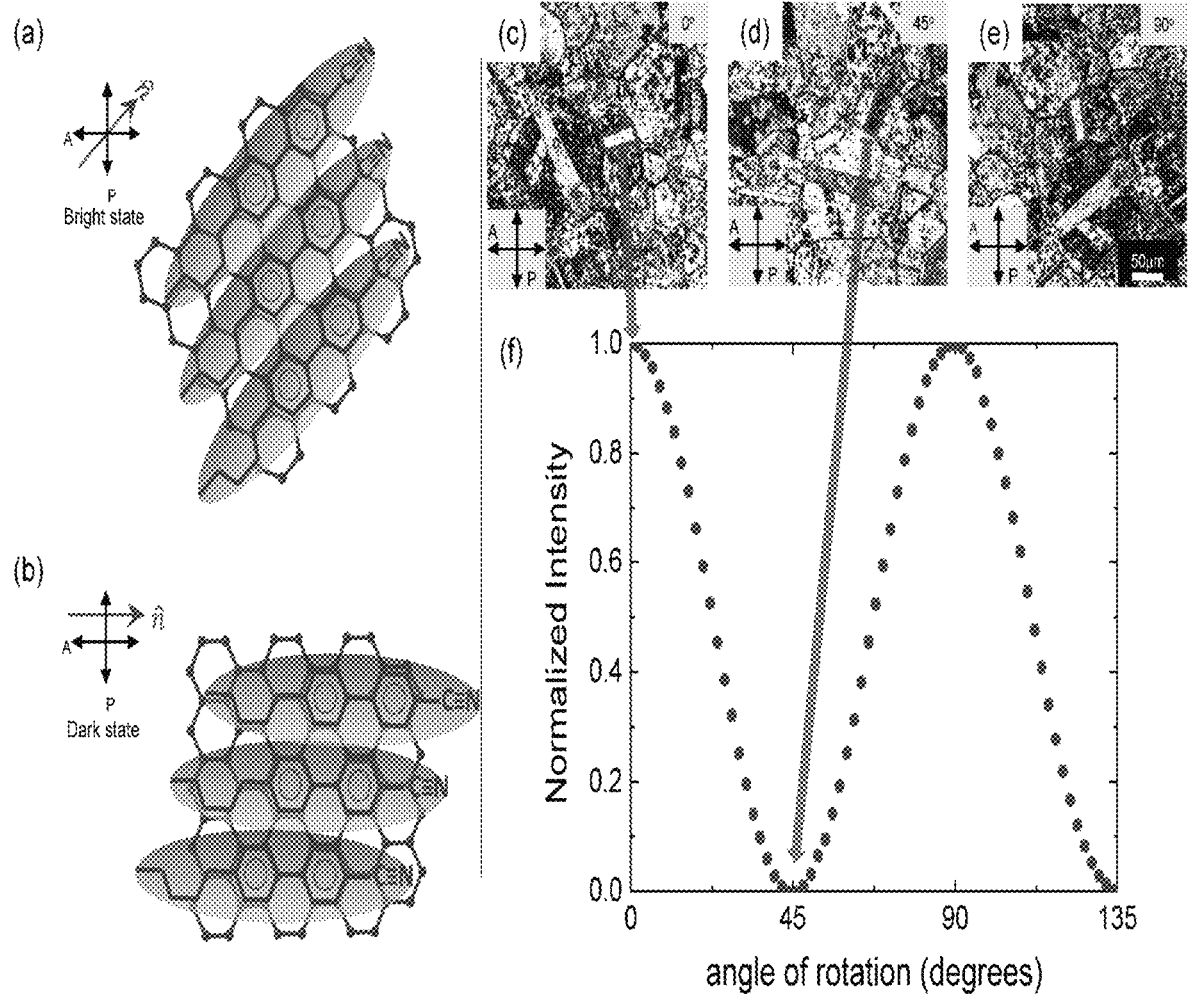
FIG. 3 illustrates a schematic representation of the alignment of nematic LC molecules on graphene due to $\pi$-$\pi$ electron stacking. The ellipsoids are LCs and the black honeycomb structure is the graphene surface. The LC molecular structure is shown in the ellipsoid on the graphene surface. The $\pi$-$\pi$ electron stacking is illustrated by matching the LC's benzene rings on the graphene-honeycomb structure. The nematic director ($\hat{n}$) is orientated at 45° with respect to the crossed polarizer (P) and analyzer (A). This orientation, therefore, produces a bright state. The system is rotated through 45° and the nematic director ($\hat{n}$) is parallel to A—which produces a dark state. Microphotographs of a thin layer of nematic LC on a monolayer graphene film on a copper substrate under a reflected crossed polarized microscope, showing a bright state, a dark state, and a bright state of the highlighted domain at 0°, 45°, and 90°, respectively, with respect to the crossed polarizers. Normalized intensity of the highlighted domain as a function of the relative angle of rotation. The bar in the micrograph represents 50 µm.

FIG. 3 illustrates the π-π stacking interaction that arises due to the overlap of the LC's benzene rings on the graphene-honeycomb structure. However, it is difficult to visualize the effect of this strong interaction in an LC+GP colloidal system. Therefore, we have studied the LC alignment mechanism on a CVD-grown monolayer graphene film on a copper foil. Between two crossed polarizers, a bright state with the maximum transmitted intensity appears when the planar-aligned LC nematic director is at 45° with the polarizer (or with the crossed-analyzer). A dark state is achieved if the director is parallel to the polarizer (or to the crossed-analyzer).

FIG. 3 schematically illustrates that the LC director on graphene is orientated at 45° with respect to the crossed polarizer and analyzer—which results in a bright state. When the system is rotated through 45°, the director orients parallel to the analyzer (FIG. 3)—which leads to a dark state.

Example 5

The CVD-grown graphene film on a copper foil was obtained. The graphene film was continuous, with irregular holes and cracks. In addition, the graphene film was polycrystalline (i.e. the presence of grains with different crystallographic orientation).

A small droplet of E7 in the isotropic phase was first placed on the graphene film. The droplet then was blown away gently by a dust blower—which left a thin LC layer on the graphene surface.

The LC coated graphene on the copper substrate then was heated up in the isotropic phase to get rid of any residual order from the coating process and then slowly cooled down to the nematic phase.

The alignment of the LC on graphene film then was studied by reflected crossed polarized microscopy by observing the bright to dark transitions as the sample was rotated over 135°.

After coating the thin LC layer on the graphene film, different crystallographic graphene domains with grain boundaries became clearly visible. FIG. 3 shows the microphotographs at three different relative angles, 0°, 45°, and 90°, with respect to the crossed polarizers. The highlighted domain intensity was tracked as the sample was rotated over 135° under the reflected crossed polarized microscope. FIG. 3 shows that after rotating 45°, the highlighted domain becomes dark.

FIG. 3 depicts that after rotating 45° more (i.e. a total of 90° from the initial state), the highlighted domain becomes bright again. FIG. 3 shows the normalized intensity of the highlighted domain as a function of the angle of rotation.

These results suggest that the LC, on graphene, can achieve a planar aligned state, which can transit from dark to bright when rotated by 45°.

This planar aligned state is employed by the strong π-π electron stacking.

This interaction still exists in the LC+GP colloidal system.

During the filling process of the LC cell, some monolayer graphene flakes sediment down and/or get stuck to the substrates from the LC+GP mixture, and align themselves horizontally on the substrates.

When some graphene flakes are preferentially attached to the substrate, they promote planar anchoring, enhancing the overall polar anchoring of the system.

Example 6

An experimental approach has been used to check the presence of graphene flakes, spontaneously deposited from the LC+GP hybrid, lying face on the substrates of the cell.

Figure 4:
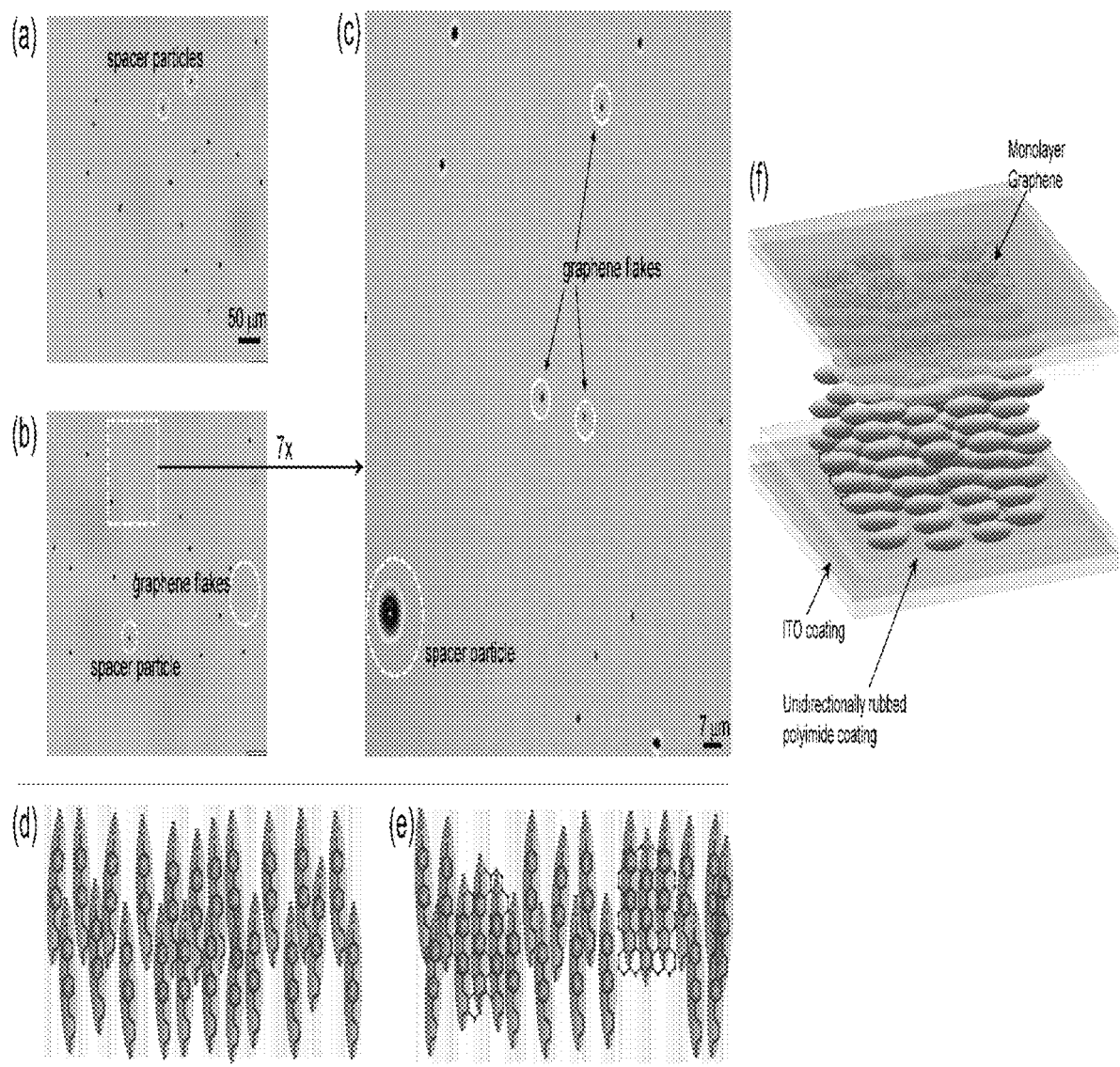
FIG. 4 illustrates a Microphotograph of the bare PI alignment substrate used in the E7 cell. Randomly dispersed spacer particles with uniform size are visible. Two of them are highlighted with dotted circles. Microphotograph of the bare PI alignment substrate used in the E7+GP cell. The dark spots, much smaller than the spacer particles, are graphene aggregates. These are small aggregated graphene flakes attached to the substrate. A spacer particle is highlighted inside a dotted circle and a few graphene flakes are highlighted inside a solid circle. A 7× magnified image of the dotted square region. A spacer particle is highlighted inside a dotted circle at the bottom left corner. All other smaller dark spots are graphene flakes in small aggregates. Schematically shown a natural LC alignment on the PI alignment substrate. An illustration of the graphene-modified substrate that enhances the average anchoring mechanism of the LC to the substrate due to the additional strong $\pi$-$\pi$ electron stacking between graphene and LC. The complete LC device where graphene flakes are attached to the PI alignment layers.

The planar cells used for E7 and E7+GP were first disassembled and carefully washed using acetone to get rid of any LC. The bare alignment substrates of the cells were studied using transmitted microscopy and the microphotographs are shown in FIG. 4. The bare alignment substrate used in the E7 cell is shown in FIG. 4. Only randomly dispersed spacer particles with uniform size are visible under the microscope.

FIG. 4 presents the bare alignment substrate used in the E7+GP cell. A careful observation reveals that in addition to the spacer particles, there present many dark spots much smaller than the spacer particles. These are small aggregated graphene flakes attached to the substrate. FIG. 4 shows a spacer particle inside a dotted circle and graphene flakes inside a solid circle. FIG. 4 presents a 7× magnified image of the dotted square region shown in FIG. 4. The presence of graphene flakes in small aggregates is clearly visible in FIG. 4. There are likely many more graphene flakes present on the surface, but they are not visible under the microscope as they are attached to the substrate in non-aggregate forms.

These results clearly indicate the presence of the adsorbed graphene layers on the alignment substrates used in the E7+GP cell.

FIG. 4 schematically shows a natural LC alignment on the alignment substrate.

FIG. 4 illustrates that the graphene-modified substrate enhances the average anchoring mechanism of the LC to the substrate due to the additional strong π-π electron stacking between graphene and LC. This mechanism leads to a strong increase in effective $W_\theta$, as shown in FIG. 2.

FIG. 4 shows the complete LC device where graphene flakes are attached to the PI alignment layers.

Example 7

Faster Electro-Optic Switching in an LC Device Due to the Enhancement in Polar Anchoring Energy.

Now we will present the impact of this enhanced $W_\theta$ on the nematic switching response. The two characteristic times, rise (voltage on) and fall (voltage off), of the nematic director, considering $W_\theta$, can be described as:

$$\tau_{rise} = \frac{\gamma_1}{\Delta\varepsilon\varepsilon_o V^2 - K_{11}\pi^2}\left(d^2 + \frac{4 d K_{11}}{W_\theta}\right), \quad (3)$$

$$\tau_{fall} = \frac{\gamma_1}{K_{11}\pi^2}\left(d^2 + \frac{4 d K_{11}}{W_\theta}\right)$$

where $\gamma_1$ is the rotational viscosity, d is the cell thickness, $\Delta\varepsilon$ is the dielectric anisotropy, $\varepsilon_0$ the is free space permittivity, $K_{11}$ is the splay elastic constant, and V ($>V_{th}$) is the driving applied voltage. $\tau_{rise}$ is the time the nematic director takes to rotate from planar to homeotropic configuration, when the voltage is turned on. Similarly, $\tau_{fall}$ is the time the director takes to relax back from homeotropic to planar configuration after the voltage is turned off.

The driving voltage, V is the dominating factor for $\tau_{rise}$. When $V \gg V_{th}$, the effect of $W_\theta$ on $\tau_{rise}$ is very small. On the other hand, if the backflow in the cell is neglected, $\tau_{fall}$ is purely driven by the elastic interaction between the LC and the alignment substrate. In the weak anchoring limit ($W_\theta \sim 10^{-4}$ to $10^{-5}$ J m$^{-2}$), $\tau_{fall}$ is greatly influenced by $W_\theta$ as the term $$\frac{K_{11}}{W_\theta}$$

in $\tau_{fall}$ cannot be neglected. Therefore, in the weak anchoring limit, an increase in $W_\theta$ results in a decrease in $\tau_{fall}$.

Since the term $$\frac{K_{11}}{W_\theta}$$

influences $\tau_{fall}$, we nave studied this term for E7 and E7+GP samples as a function of temperature. The capacitive data for the planar cells were used to extract $K_{11}$ using the Fréedericksz transition method.

Figure 5:
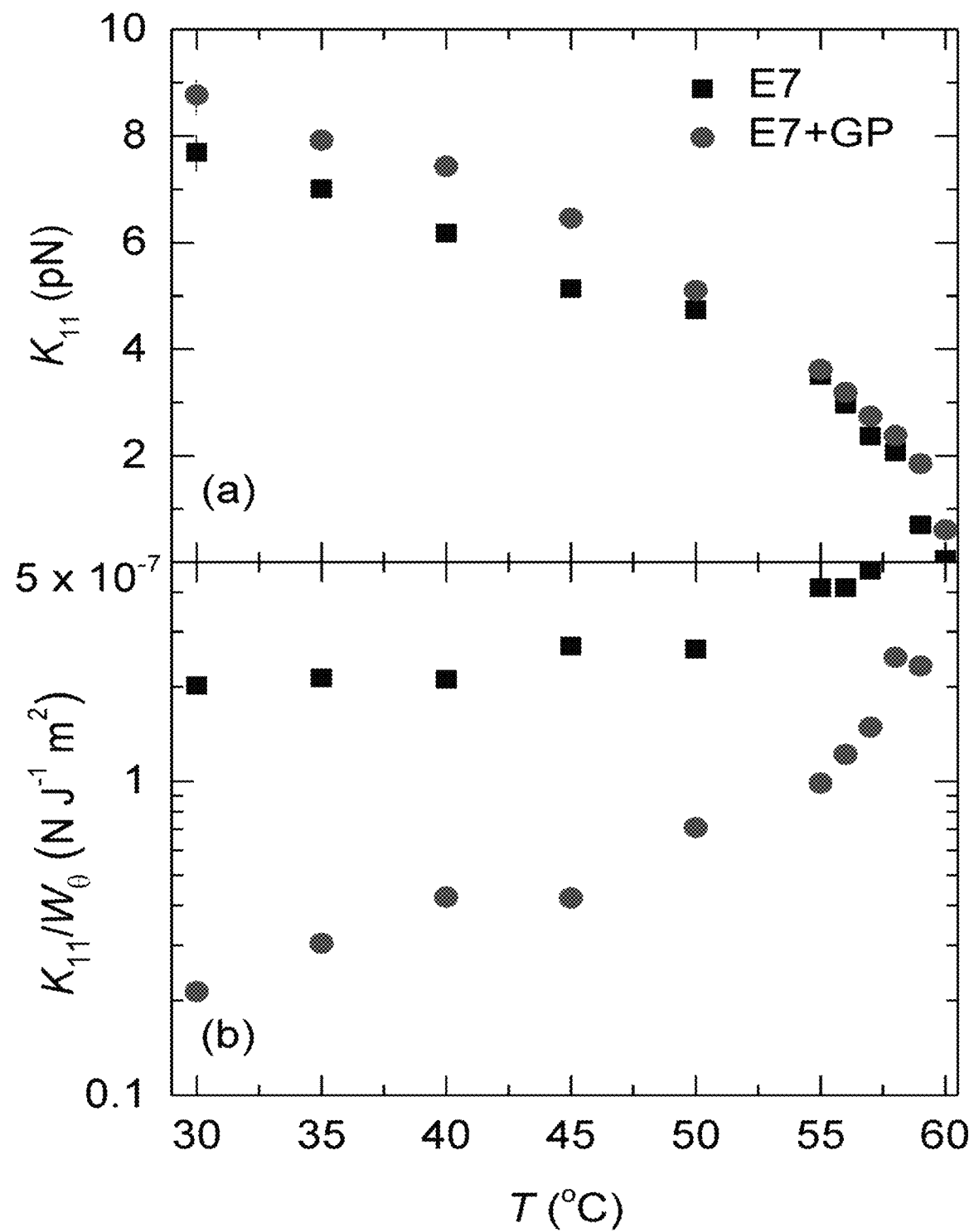
FIG. 5 illustrates Splay elastic constant, $K_{11}$ as a function of temperature for E7 and E7+GP. Typical error bars are shown.

FIG. 5 shows $K_{11}$ as a function of temperature for E7 and E7+GP samples. Away from the transition temperature, the E7+GP sample shows an increase in $K_{11}$. The term $$\frac{K_{11}}{W_\theta}$$

was calculated using the results shown in FIG. 2 and FIG. 5, and then plotted as a function of temperature in FIG. 5.

Clearly, $$\frac{K_{11}}{W_\theta}$$

is significantly reduced in the E7+GP sample, which is expected to accelerate $\tau_{fall}$.

Example 8

The field-induced nematic switching was studied from the electro-optic response of the LC cells.

The optical setup consisted of a beam from a 5-mW He—Ne laser at wavelength 633 nm that passed through a polarizer, the cell, a crossed analyzer and into a nanosecond Newport photodetector. The beam was polarized at an angle of 45° with respect to the cell's rubbing direction. The output of the detector was fed into a digital storage oscilloscope. A dc voltage pulse of 10 V (much higher than the threshold switching voltage) at a pulse interval of 20 Hz was applied across the cell and, the change in transmitted intensity as a function of time (both when the voltage was turned on and off) was detected by the oscilloscope.

Transmitted responses for voltage on and voltage off were studied as a function of temperature for pure E7 and E7+GP samples. The setup was computer controlled and data acquisition was performed using LabVIEW® software.

Example 9

In another embodiment of the invention, shown in FIG. 6, the electro-optic response time is significantly accelerated when the LC is doped with monolayer graphene flakes.

FIG. 6 represents the normalized transmitted intensity response (left Y-axis) as a function of time for voltage off and voltage on for E7 and E7+GP at T=30° C. The right Y-axis shows the applied voltage profile across the cells. The transmitted intensity increases as a function of time for E7 and E7+GP, as the applied voltage is turned off at time t=0.

It is apparent that E7+GP sample relaxes faster than pure E7 when the voltage is turned off. The time the transmitted intensity takes to rise from 10% to 90% of the maximum intensity, after the voltage is turned off, is defined as the optical switching off, $\tau_{off}$. When the applied voltage is turned on at t=25 ms, the transmitted intensity drops as a function of time for E7 and E7+GP. The time the transmitted intensity takes to drop from 90% to 10% of the maximum intensity, after the voltage is turned on, is defined as the optical switching on, $\tau_{on}$. Note that $\tau_{rise}$ and $\tau_{fall}$ are not equal to the electro-optical responses—$\tau_{on}$ and $\tau_{off}$, respectively. However, the optical response is mainly due to the director's rotation after the voltage is turned on or off. Therefore, neglecting the backflow in the cell, one can write $\tau_{rise} \propto \tau_{on}$ and $\tau_{fall} \propto \tau_{off}$.

FIG. 7 shows $\tau_{on}$ and $\tau_{off}$, respectively, as a function of temperature for E7 and E7+GP. Even though $\tau_{on}$ does not show any significant difference, $\tau_{off}$ shows a dramatic decrease for the E7+GP sample.

This accelerated switching response is attributed to the significant enhancement in $W_\theta$ due to the presence of graphene in the LC and on the alignment substrate.

The hexagonal 2D layer is not necessarily limited to graphene flakes, but includes any other 2D hexagonal material with a propensity to align LC materials and mixtures. Potential materials include, but are not limited to, hexagonal boron nitride, borophene, germanine, phosphorene, silicone, and molybdenite.

The monolayer graphene flakes may be chemically modified directly to promote uniaxial LC alignment on the surface. Uniaxial alignment of LC on graphene may be promoted by adding an additional photoalignment step, whereby polarized light is used to absorb or chemically bond LC-compatible molecules to the graphene surface.

Uniaxial alignment of LC on graphene may be promoted by non-surface means including, but not limited to flow alignment, photo-orientation and slow cooling from the isotropic phase.

The LC layer can be comprised of a single molecular component or mixtures of components with a liquid crystal phase, including but not limited to nematic, cholesteric, smectic and discotic phases. The LC may possess a positive or negative dielectric anisotropy and a permanent molecular dipole to facilitate molecular switching in response to an applied voltage. The graphene can be multi-layered.

This invention discloses the use of monolayer graphene flakes as a planar anchoring amplifier on the polyimide (PI) substrate and for faster electro-optic switching response in a nematic LC.

The invention enables a new product employing graphene flakes on the polyimide alignment layers in an LC display device for accelerated response time.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What I claim is:

1. A method of achieving higher polar anchoring strength of liquid crystal (LC) using monolayer graphene flakes in an LC device and attaining faster electro-optic switching in an LC device comprising the steps of:
   providing a graphene sample in an ethanol solvent
      wherein the graphene sample comprises monolayer flakes;
   mixing the graphene sample and the ethanol solvent and forming a graphene and ethanol solution;
   adding a liquid crystal to the graphene and ethanol solution;
      wherein the liquid crystal comprises liquid crystal E7 comprising nematic-isotropic phase transition temperature ($T_{NI}$) of 60.5° C.;
   allowing the liquid crystal to dissolve into the graphene and ethanol solution;
   forming a liquid crystal graphene ethanol solution;
   evaporating the ethanol from the liquid crystal graphene ethanol solution;
   forming a liquid crystal graphene mixture;
   degassing the liquid crystal graphene mixture; and
   forming a pure liquid crystal graphene mixture;
   filling an LC cell having polyimide (PI) planar-alignment layers with the liquid crystal graphene mixture;
   wherein the graphene flakes sediment down from the liquid crystal graphene mixture and preferentially attach to the PI alignment layers during the filling step of the LC cell; and
   wherein the graphene modifies the anchoring property of the LC.

2. The method of achieving higher polar anchoring strength of liquid crystal (LC) using monolayer graphene flakes in an LC device and attaining faster electro-optic switching in an LC device of claim 1 further including the steps of:
   enhancing the effective polar anchoring energy in the LC cell by an order of magnitude via the π-π electron stacking between the graphene flakes on the PI planar-alignment layers and LC molecules; and
   accelerating the electro-optic response of the LC due to higher anchoring energy in the LC cell.

3. The method of achieving higher polar anchoring strength of liquid crystal (LC) using monolayer graphene flakes in an LC device and attaining faster electro-optic switching in an LC device of claim 1
   wherein the monolayer flakes have an average thickness of 0.35 nm and an average lateral size of 550 nm and
   wherein the liquid crystal graphene mixture is liquid crystal E7 and pristine graphene mixture.

4. The method of achieving higher polar anchoring strength of liquid crystal (LC) using monolayer graphene flakes in an LC device and attaining faster electro-optic switching in an LC device of claim 1
   wherein the graphene concentration in the liquid crystal E7 is $2.5 \times 10^{-3}$ wt %.

5. The method of achieving higher polar anchoring strength of liquid crystal (LC) using monolayer graphene flakes in an LC device and attaining faster electro-optic switching in an LC device of claim 1
   wherein the step of degassing the liquid crystal graphene mixture occurs under vacuum.

6. The method of achieving higher polar anchoring strength of liquid crystal (LC) using monolayer graphene flakes in an LC device and attaining faster electro-optic switching in an LC device of claim 1
   wherein the graphene sample comprises more than 97% monolayer flakes.

* * * * *